United States Patent
Mitsuda

(10) Patent No.: US 12,323,702 B2
(45) Date of Patent: Jun. 3, 2025

(54) CONTROL APPARATUS, LENS APPARATUS, IMAGE PICKUP APPARATUS, CONTROL METHOD, AND STORAGE MEDIUM

(71) Applicant: CANON KABUSHIKI KAISHA, Tokyo (JP)

(72) Inventor: Yu Mitsuda, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 211 days.

(21) Appl. No.: 17/841,139

(22) Filed: Jun. 15, 2022

(65) Prior Publication Data

US 2022/0417443 A1 Dec. 29, 2022

(30) Foreign Application Priority Data

Jun. 25, 2021 (JP) ................. 2021-105323

(51) Int. Cl.
*H04N 23/67* (2023.01)
*H04N 23/959* (2023.01)

(52) U.S. Cl.
CPC ......... *H04N 23/672* (2023.01); *H04N 23/959* (2023.01)

(58) Field of Classification Search
CPC .... H04N 23/67; H04N 23/663; H04N 23/667; H04N 23/672; H04N 23/959
USPC ......................................................... 348/137
See application file for complete search history.

(56) References Cited

U.S. PATENT DOCUMENTS

| 2006/0133791 | A1* | 6/2006 | Miyata | H04N 23/69 348/E5.045 |
| 2009/0115883 | A1* | 5/2009 | Tsuchiya | G03B 13/00 348/E5.024 |
| 2011/0199498 | A1* | 8/2011 | Matsuzawa | H04N 23/69 348/240.2 |
| 2020/0259992 | A1* | 8/2020 | Ichinose | H04N 23/72 |
| 2021/0243373 | A1* | 8/2021 | Toyoda | H04N 23/675 |

FOREIGN PATENT DOCUMENTS

| JP | H10197782 A | 7/1998 |
| JP | 2006106356 A | 4/2006 |
| JP | 2009025507 A | 2/2009 |
| JP | 5843442 B2 | 1/2016 |

* cited by examiner

*Primary Examiner* — William C Vaughn, Jr.
*Assistant Examiner* — Astewaye Gettu Zewede
(74) *Attorney, Agent, or Firm* — ROSSI, KIMMS & McDOWELL LLP

(57) ABSTRACT

A control apparatus includes a first control unit configured to automatically adjust a focus lens to an in-focus position, and a second control unit configured to adjust the focus lens based on an operation amount of a user. The first control unit and the second control unit are enabled in a first driving area of the focus lens. The first control unit is disenabled in a second driving area of the focus lens. While the first control unit adjusts the focus lens to the in-focus position, the second control unit is disenabled in the second driving area.

12 Claims, 7 Drawing Sheets

CONTROL APPARATUS, LENS APPARATUS, IMAGE PICKUP APPARATUS, CONTROL METHOD, AND STORAGE MEDIUM

BACKGROUND

Technical Field

The disclosure relates to a control apparatus that can provide focusing by driving a focus lens, and its control method.

Description of the Related Art

Autofocus (AF) and manual focus (1 W) are known as methods that drive the focus lens so as to provide focusing. AF is a focusing method by calculating an in-focus position of the focus lens based on an AF evaluation value generated from an AF sensor. MF is a focusing method in which a user manually operates a focus ring.

Zoom tracking control is also known that corrects image plane fluctuations that occur when a zoom lens is driven by driving the focus lens and maintains the in-focus state. Japanese Patent No. ("JP") 5843442 discloses a method of switching an area mode based on electronic cam (tracking curve) information indicating a relationship between a zoom lens position and a focus lens position that maintains the in-focus state during zooming.

However, the method disclosed in JP 5843442 may switch the area mode against the intention of the user when the zoom tracking control is performed by the user's zoom operation. Here, the area mode includes a mode relating to an AF-enabled area in which focusing can be performed by both AF and MF, and a mode relating to an MF-dedicated area in which focusing can be performed only by MF.

In the MF-dedicated area, the focus lens can be driven and an image can be acquired from an image sensor, but AF is unavailable due to restrictions such as an incident angle of a light ray entering the AF sensor. Hence, if the AF-enabled area is switched to the MF-dedicated area against the intention of the user by an operation other than the MF operation such as the zoom operation, the AF state may be forcibly changed to the MF state and the user may be confused.

Full-time MF for prioritizing the MF operation over AF even in the AF mode so as to provide focusing by the MF operation is also known in a lens apparatus that can switch the AF mode and the MF mode. In a case where the user unintentionally drives the lens to the MF-dedicated area in full-time MF, AF may not work and the user may be confused.

SUMMARY

The disclosure provides a control apparatus, a lens apparatus, an image pickup apparatus, a control method, and a storage medium, each of which can prevent switching from an AF-enabled area to the MF-dedicated area against the intention of a user and improve the user's operability.

A control apparatus according to one aspect of the disclosure includes at least one processor, and at least one memory coupled to the at least one processor storing instructions that, when executed by the at least one processor, cause the at least one processor to function as a first control unit configured to automatically adjust a focus lens to an in-focus position, and a second control unit configured to adjust the focus lens based on an operation amount of a user. The first control unit and the second control unit are enabled in a first driving area of the focus lens. The first control unit is disenabled in a second driving area of the focus lens. While the first control unit adjusts the focus lens to the in-focus position, the second control unit is disenabled in the second driving area. A lens apparatus and an image pickup apparatus according to another aspect of the disclosure include the above control apparatus. A control method corresponding to the above control apparatus and a non-transitory computer-readable storage medium storing a program that causes a computer to execute this control method also constitute another aspect of the disclosure.

Further features of the disclosure will become apparent from the following description of exemplary embodiments with reference to the attached drawings.

DESCRIPTION OF THE EMBODIMENTS

Referring now to the accompanying drawings, a detailed description will be given of embodiments according to the disclosure.

Figure 1:
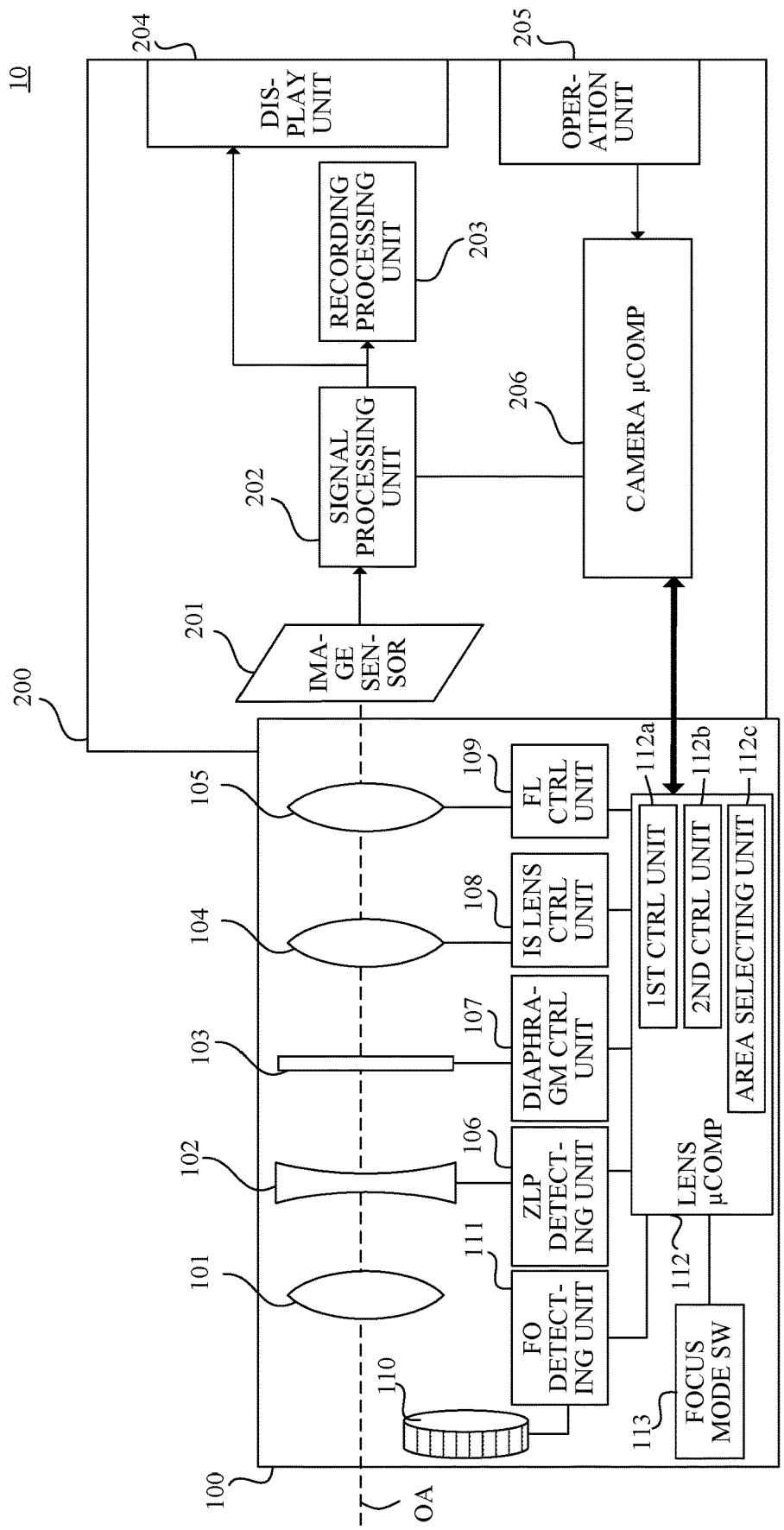
FIG. 1 is a block diagram of an image pickup apparatus according to each embodiment.

A description will now be given of a configuration of an image pickup apparatus 10 according to each embodiment. FIG. 1 is a block diagram of the image pickup apparatus 10. The image pickup apparatus 10 includes a camera body (image pickup apparatus body) 200 and an interchangeable lens (lens apparatus) 100 attachable to and detachable from the camera body 200. However, the image pickup apparatus according to each embodiment is not limited to this example, and the camera body and the lens apparatus may be integrated with each other.

The interchangeable lens 100 is mechanically and electrically connected to the camera body 200 via an unillustrated mount. The interchangeable lens 100 receives power from the camera body 200 via an unillustrated power supply terminal provided on the mount. The interchangeable lens 100 controls various actuators and a lens microcomputer 112, which will be described below, using the power received from the camera body 200. The camera body 200 (camera microcomputer 206 as a communication unit) communicates with the interchangeable lens 100 via an unillustrated communication terminal portion provided on the mount and transmits a control command to the interchangeable lens 100, thereby controlling the interchangeable lens 100.

The camera body 200 includes an image sensor 201 having a phase difference AF sensor function, a signal processing unit 202, a recording processing unit 203, a display unit 204, an operation unit 205, and a camera microcomputer 206. The image sensor 201 has a CMOS sensor or a CCD sensor, and photoelectrically converts an object image (optical image) formed by an imaging optical system in the interchangeable lens 100 to output an electric signal (analog signal). The analog signal output from the image sensor 201 is converted into a digital signal by an unillustrated A/D conversion circuit.

The signal processing unit 202 performs various image processing for the digital signal from the A/D conversion circuit and generates a video signal. The signal processing unit 202 generates a contrast state of the object image, that is, focus information indicating a focus state of the imaging optical system and luminance information indicating an exposure state from the video signal. The signal processing unit 202 outputs the video signal to the display unit 204, and the display unit 204 displays the video signal as a live-view image for confirmation of a composition, a focus state, or the like. The signal processing unit 202 outputs the video signal to the recording processing unit 203. The recording processing unit 203 stores the video signal as still image or moving (or motion) image data in an external memory or the like.

The camera microcomputer 206 as a camera control unit controls the camera body 200 in response to inputs from an imaging instruction switch, various setting switches, and the like included in the operation unit 205. The camera microcomputer (communication unit) 206 transmits via the communication terminal unit to the lens microcomputer 112 a control command regarding a light amount adjusting operation of a diaphragm (aperture stop) unit 103 according to luminance information and a focusing operation of the focus lens 105 according to focus information.

The interchangeable lens 100 includes the imaging optical system, each control unit that controls each actuator that drives the imaging optical system, an operation ring 110 for operating the focus lens 105, a lens microcomputer 112, and a focus mode switch (setting unit) 113.

The lens microcomputer 112 is a lens control unit (control apparatus) that controls the operation of each component in the interchangeable lens 100. The lens microcomputer (communication unit) 112 receives the control command transmitted from the camera body 200 and receives a lens data transmission request via the communication terminal unit. The lens microcomputer 112 performs lens control corresponding to the control command, and transmits the lens data corresponding to the transmission request to the camera body 200. The lens microcomputer 112 transmits a focus mode (AF mode or MF mode) selected by the focus mode switch 113 to the camera body 200.

The lens microcomputer 112 outputs a command to a diaphragm control unit 107 and a focus-lens (FL) control unit 109 in response to a command relating to light intensity adjustment and a command relating to focusing among the control commands. The diaphragm control unit 107 and the focus-lens control unit 109 drive the diaphragm unit 103 and the focus lens 105, respectively, according to the command from the lens microcomputer 112. This configuration can perform light amount adjusting processing using the diaphragm unit 103 and AF processing for controlling the focusing operation using the focus lens 105. The lens microcomputer 112 outputs a command to the focus-lens control unit 109 to drive the focus lens 105 according to an operation amount of the operation ring 110, and controls the focusing operation.

In each embodiment, the lens microcomputer 112 includes a first control unit 112a, a second control unit 112b, and an area selecting unit 112c. The first control unit 112a automatically adjusts the focus lens 105 to the in-focus position (that is, the first control unit 112a has an AF control function). The second control unit 112b manually adjusts the focus lens 105 (based on the operation amount of the user) (that is, the second control unit 112b has an MF control function). The area selecting unit 112c selects a driving area (AF-enabled area or MF-dedicated area) of the focus lens 105.

In this embodiment, the lens microcomputer 112 includes a first control unit 112a, a second control unit 112b, and an area selecting unit 112c. This means that the lens microcomputer 112 has a function corresponding to the first control unit 112a, a function corresponding to the second control unit 112b, and a function corresponding to the area selecting unit 112c.

The first control unit 112a and the second control unit 112b are enabled in the first driving area (AF-enabled area) of the focus lens 105, and the first control unit 112a is disenabled in the second driving area (MF-dedicated area) of the focus lens 105. The second control unit 112b is disenabled in the second driving area under a predetermined condition described in each embodiment described below.

The imaging optical system includes a field lens 101, a zoom lens 102 for magnification variation, the diaphragm unit 103 for adjusting a light amount, an image stabilizing lens 104, and a focus lens 105 for performing focusing. The zoom lens 102 is movable in a direction along an optical axis OA (optical axis direction) illustrated by a broken line in FIG. 1, and is driven in the optical axis direction when the user operates a zoom operation unit connected to an unillustrated zoom mechanism. This configuration performs magnification variation (zooming) in which the focal length of the imaging optical system is varied by moving the zoom lens 102.

A zoom-lens-position (ZLP) detecting unit 106 detects the zoom lens position using a position detecting sensor such as a variable resistor, and outputs position data of the zoom lens 102 to the lens microcomputer 112. The position data output from the ZLP detecting unit 106 is used by the lens microcomputer 112 for zoom tracking control and the like, which will be described below.

The diaphragm unit 103 includes diaphragm blades and a sensor such as a Hall element. The states of the diaphragm blades are detected by the sensor and output to the lens microcomputer 112. The diaphragm control unit 107 outputs a driving signal in accordance with the command from the lens microcomputer 112 to drive an actuator such as a stepping motor and a voice coil motor. Thereby, the light amount can be adjusted by the diaphragm unit 103.

The image stabilizing (IS) lens 104 moves in a direction orthogonal to the optical axis OA of the imaging optical system to reduce image blur caused by camera shake or the like. An image-stabilizing-lens control unit 108 outputs a driving signal to drive an image stabilizing actuator according to a command from the lens microcomputer 112 in accordance with the shake detected by an unillustrated shake sensor such as a vibration gyro. This configuration can provide image stabilizing processing that controls a shift operation of the image stabilizing lens 104.

The focus lens 105 is movable in the optical axis direction. The position of the focus lens 105 is detected with a position detecting sensor such as a photo-interrupter, and the position data is output to the lens microcomputer 112. The focus-lens control unit 109 outputs a driving signal to drive an actuator such as a stepping motor according to the command from the lens microcomputer 112, and moves the focus lens 105 for providing focusing.

As methods of driving the focus lens 105 for providing focusing, there are autofocus (AF) that provides automatic focusing and manual focus (MF) that provides manual focusing. The camera microcomputer (communication unit) 206 acquires the setting state of the focus mode selected by the focus mode switch 113 via the communication terminal unit, and determines which mode the user has set, the AF mode or the MF mode. In the case where the AF mode is selected, the camera microcomputer 206 transmits a control command relating to focusing to the lens microcomputer 112. On the other hand, in the case where the MF mode is selected, the camera microcomputer 206 does not transmit the control command relating to focusing, and gives priority to the operation of the operation ring 110. Full-time MF gives priority to the operation of the operation ring 110 even in the AF mode depending on the setting of the operation unit 205. Full-time MF is enabled during the AF operation (during AF control) by half-pressing an unillustrated release button and after an in-focus state by AF is obtained. No condition for enabling full-time MF may be set. In this case, for example, even in the AF mode, the operation of the operation ring 110 is always prioritized.

In AF, the camera microcomputer 206 calculates the in-focus position of the focus lens 105 from an AF evaluation value corresponding to the image signal generated by the image sensor 201, and transmits the control command relating to focusing to the lens microcomputer 112 via the communication terminal unit. In response to the control command, the lens microcomputer 112 issues a command to the focus-lens control unit 109 to drive the focus lens 105 and control the focusing operation. On the other hand, in MF, the lens microcomputer 112 issues a command to the focus-lens control unit 109 to drive the focus lens 105 according to the operation amount of the operation ring 110, and controls the focusing operation.

Figure 2:
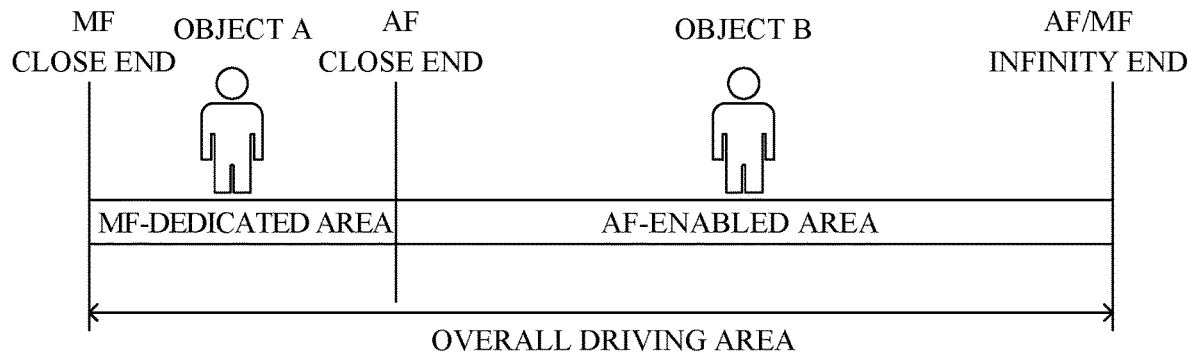
FIG. 2 illustrates an AF-enabled area and an MF-dedicated area according to each embodiment.

Referring now to FIG. 2, a description will be given of the AF-enabled area and the MF-dedicated area. FIG. 2 illustrates the AF-enabled area and the MF-dedicated area. The AF-enabled area is an area between the AF/MF infinity end and the AF close end, and the MF-dedicated area is an area between the MF close end and the AF close end. An area including the AF-enabled area and the MF-dedicated area is an overall driving area.

The AF-enabled area is an area in which focusing can be performed by both AF and MF, and an object B in the AF-enabled area can be focused by both AF and MF. On the other hand, the MF-dedicated area is an area in which focusing cannot be performed by AF but can be performed only by MF, and an object A in the MF-dedicated area can be focused only by MF. At this time, even if the user has selected the AF mode with the focus mode switch 113, the MF mode is set because AF is unavailable in this area.

Each embodiment is not limited to the above configuration and, for example, the focus mode switch 113 may be included in the operation unit 205 of the camera body 200. In that case, the camera microcomputer 206 transmits the setting state of the selected focus mode to the lens microcomputer 112 via the communication terminal unit. The interchangeable lens 100 does not have to be a zoomable lens, and may not include the zoom lens 102 or the ZLP detecting unit 106.

A detailed description will now be given of a control method of the image pickup apparatus 10 according to each embodiment.

First Embodiment

A description will now be given of a first embodiment according to the disclosure. In this embodiment, in the case where the focus lens 105 is driven by AF or full-time MF during AF, the AF-enabled area illustrated in FIG. 2 is selected as the driving area of the focus lens 105. On the other hand, in the case where the focus lens 105 is driven by MF, the area (overall driving area) including the AF-enabled area and the MF-dedicated area illustrated in FIG. 2 is selected as the driving area of the focus lens 105.

Figure 3:
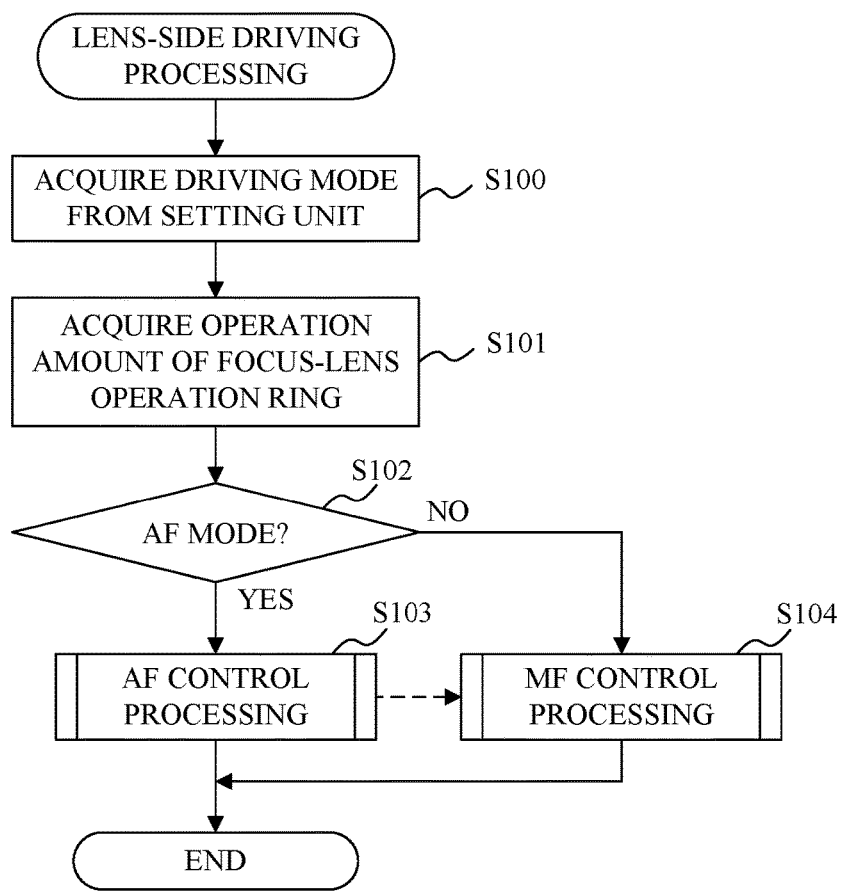
FIG. 3 is a flowchart illustrating a control method of a lens apparatus according to first to third embodiments.
Figure 4:
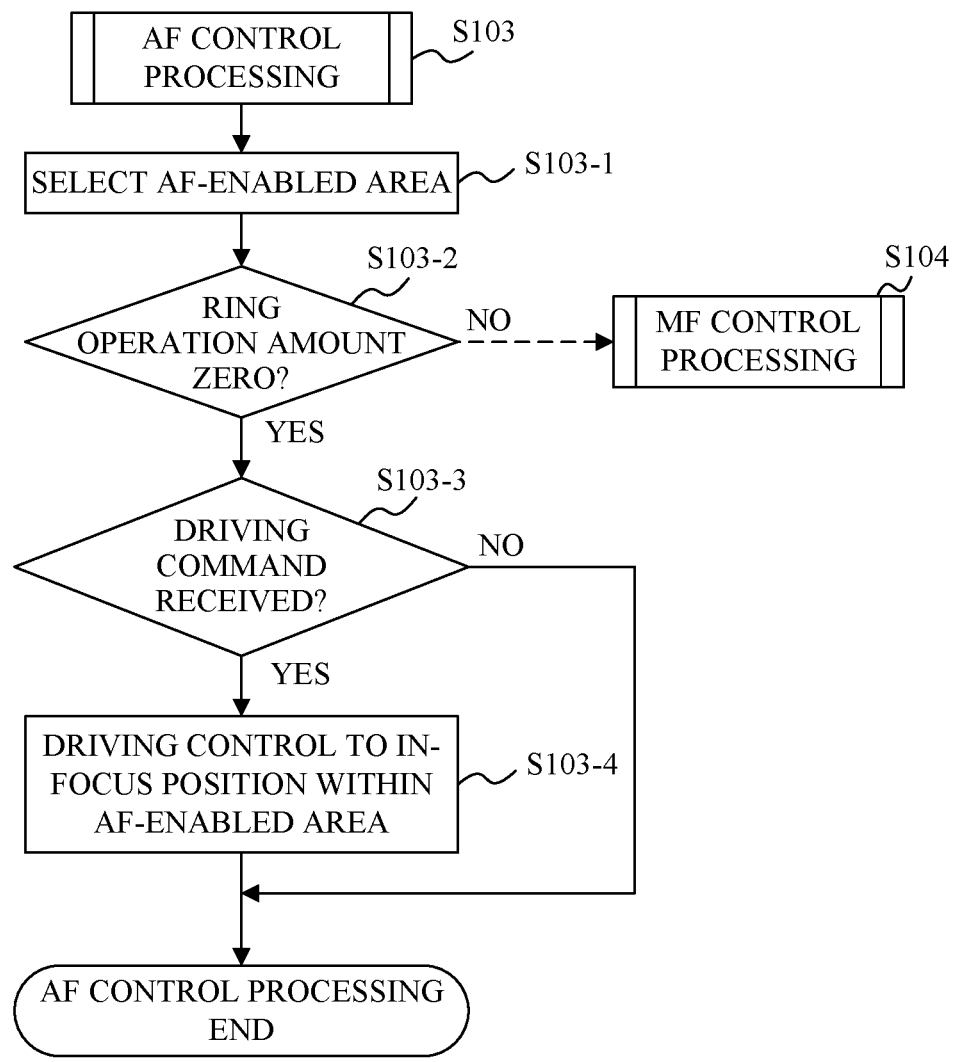
FIG. 4 is a flowchart illustrating AF control in the lens apparatus according to the first to third embodiments.
Figure 5:
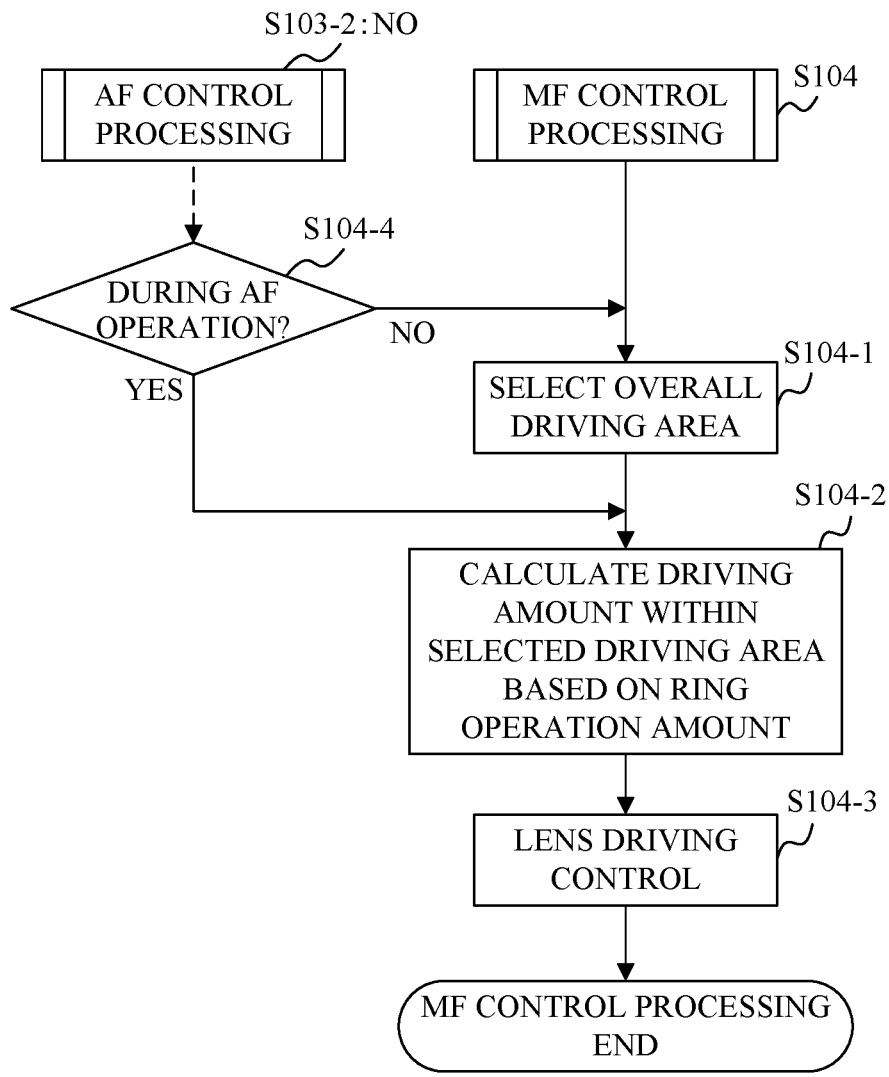
FIG. 5 is a flowchart illustrating MF control in the lens apparatus according to the first embodiment.

Referring now to FIGS. 3 to 5, a description will be given of the setting of a driving area during full-time MF driving in AF in this embodiment. FIG. 3 is a flowchart illustrating a control method (lens-side driving processing) of the interchangeable lens 100. FIG. 4 is a flowchart illustrating AF control (AF control processing) in the interchangeable lens 100. FIG. 5 is a flowchart illustrating MF control (MF control processing) in the interchangeable lens 100, and illustrates the MF control processing during full-time MF driving in AF and at a normal time, respectively.

Referring now to FIG. 3, a description will be given of the lens-side driving processing. In step S100, the lens microcomputer 112 refers to the focus mode switch 113 and acquires a driving mode (focus mode) of the interchangeable lens 100. Next, in step S101, the lens microcomputer 112 acquires an operation amount (ring operation amount) of the operation ring 110 from a focus-ring operation-amount (FO) detecting unit 111. Next, in step S102, the lens microcomputer 112 determines whether or not the driving mode (driving mode set by the focus mode switch 113) acquired in step S100 is the AF mode. In the case where the driving mode is the AF mode, the flow proceeds to step S103, and the lens microcomputer 112 (first control unit 112a) performs AF control processing. On the other hand, in the case where the driving mode is the MF mode, the flow proceeds to step S104, and the lens microcomputer 112 (second control unit 112b) performs MF control processing. After executing each control processing, the lens-side driving processing ends.

Referring now to FIG. 4, a description will be given of the AF control processing. When the flow proceeds to step S103 and the AF control processing is started, the lens microcomputer 112 (area selecting unit 112c) selects the AF-enabled area (first driving area) in step S103-1. Next, in step S103-2, the lens microcomputer 112 determines the ring operation amount acquired in step S101. When the ring operation amount is zero, the lens microcomputer 112 continues the AF control processing and the flow proceeds to step S103-3. On the other hand, when the ring operation amount is not zero, the lens microcomputer 112 shifts to the MF control processing by the full-time MF function, and the flow proceeds to step S104.

In step S103-3, the lens microcomputer 112 determines whether or not it has received a driving command from the camera microcomputer 206. In the case where it has received the driving command, the flow proceeds to step S103-4. In step S103-4, according to the command of the lens microcomputer 112, the focus-lens control unit 109 drives and controls the focus lens 105 to a focus position (in-focus position) within the AF-enabled area selected in step S103-1. On the other hand, in the case where the lens microcomputer 112 has received the driving command in step S103-3, the AF control processing ends.

Referring now to FIG. 5, a description will be given of the MF control processing. In the case where the driving mode is set to the MF mode in step S102 and the flow shifts to the MF control processing, the flow proceeds to step S104-1. In step S104-1, the lens microcomputer 112 (area selecting unit 112c) selects the overall driving area including the AF-enabled area (first driving area) and the MF-dedicated area (second driving area). Next, in step S104-2, the lens microcomputer 112 calculates a driving amount of the focus lens 105 in the overall driving area selected in step S104-1 based on the ring operation amount acquired in step S101. Next, in step S104-3, the focus-lens control unit 109 drives and controls the focus lens 105 based on the driving amount of the focus lens 105 according to the command of the lens microcomputer 112, and ends the MF control processing.

If it is determined that the ring operation amount is not zero during the AF operation (step S103-2: No) and the flow shifts to the MF control processing, the flow proceeds to step S104-4. In step S104-4, the lens microcomputer 112 determines whether or not the AF operation is in progress. The AF operation being in progress is, for example, that the lens microcomputer 112 (first control unit 112a) adjusts the focus lens 105 to the in-focus position while the release button is being half-pressed. During the AF operation, the lens microcomputer 112 performs the MF driving processing (steps S104-2 and S104-3) in the AF-enabled area (first driving area) selected in step S103-1. On the other hand, if the AF operation is not in progress, the flow proceeds to step S104-1. In step S104-1, the lens microcomputer 112 selects the overall driving area, performs the MF driving processing (steps S104-2 and S104-3), and ends the MF control processing.

Thus, when the AF control processing or the MF control processing is completed, the lens-side driving processing is completed. In this embodiment, while the first control unit 112a adjusts the focus lens 105 to the in-focus position (for example, the AF operation is in progress while the release button is being half-pressed), the second control unit 112b is disenabled in the MF-dedicated area. That is, in this embodiment, the area during MF driving in the AF operation is limited to the AF-enabled area. This configuration can prevent the user from unintentionally moving the focus lens to the MF-dedicated area, and improve the operability of the user.

Second Embodiment

A description will now be given of a second embodiment of the disclosure. This embodiment selects the AF-enabled area illustrated in FIG. 2 as the driving area of the focus lens 105 in driving the focus lens 105 by AF or full-time MF after the in-focus state is obtained by AF. On the other hand, when the focus lens 105 is driven by MF, an area (overall driving area) including the AF-enabled area and the MF-dedicated area illustrated in FIG. 2 is selected as the driving area for the focus lens 105.

Figure 6:
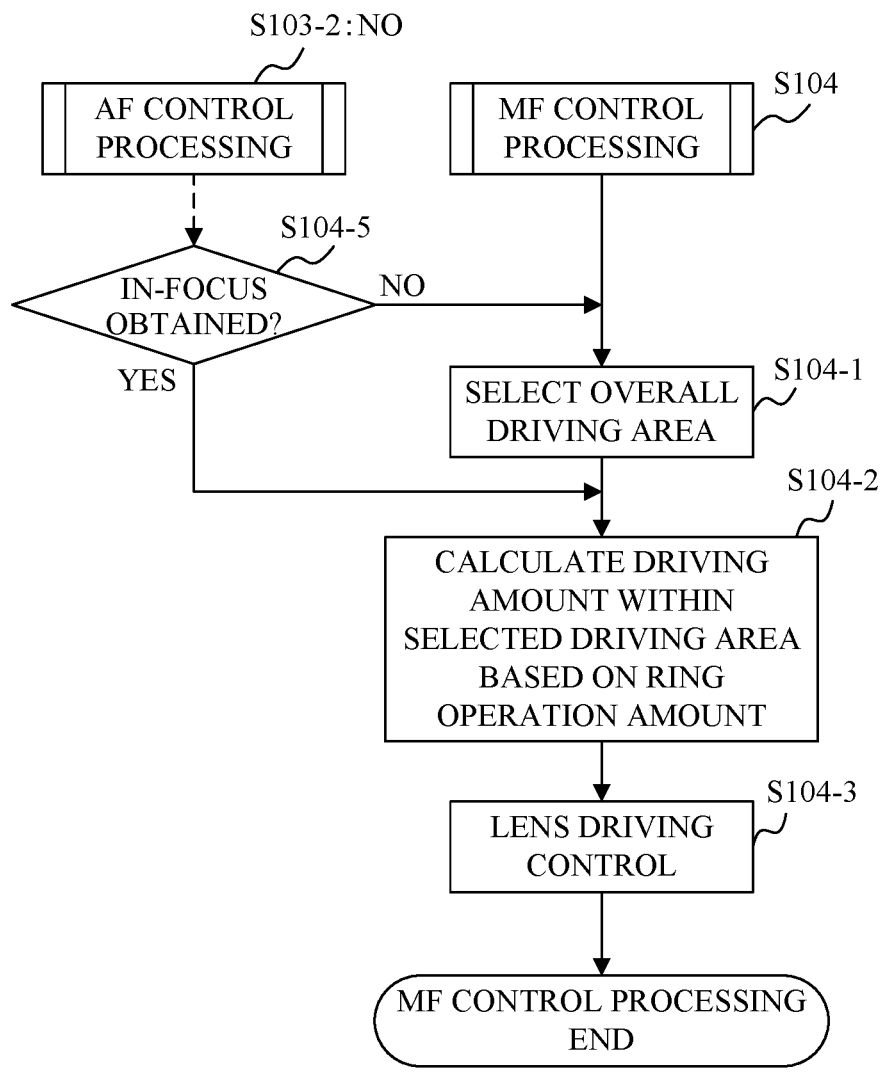
FIG. 6 is a flowchart illustrating MF control in the lens apparatus according to the second embodiment.

Referring now to FIG. 6, a description will be given of the setting of a driving area during full-time MF driving in AF in this embodiment. FIG. 6 is a flowchart illustrating the MF control (MF control processing) in the interchangeable lens 100, and illustrates the MF control processing during full-time MF driving after the in-focus state is obtained by AF and at a normal time, respectively. In this embodiment, the lens-side driving processing and the lens-side AF control processing are similar to those in the first embodiment, and thus a description thereof will be omitted.

In the case where it is determined that the ring operation amount is not zero during the AF control processing (step S103-2: No) and the flow proceeds to the MF control processing, the flow proceeds to step S104-5. In step S104-5, the lens microcomputer 112 determines whether the in-focus state is obtained by AF. If the in-focus state has been obtained by AF, the flow proceeds to step S104-2. In step S104-2, the lens microcomputer 112 performs MF driving processing (steps S104-2 and S104-3) in the AF-enabled area (first driving area) selected in step S103-1, and ends the MF control processing. On the other hand, in the case where the in-focus state has not yet obtained by AF, the flow proceeds to step S104-1. In step S104-1, the lens microcomputer 112 selects the overall driving area including the AF-enabled area (first driving area) and the MF-dedicated area (second driving area), performs the MF driving processing (steps S104-2 and S104-3), and completes the MF control processing.

Thus, in this embodiment, after the first control unit 112a adjusts the focus lens 105 to the in-focus position (for example, after the AF operation is completed while the release button is half-pressed), the second control unit 112b is disenabled in the MF-dedicated area. That is, in this embodiment, the area during full-time MF driving after the in-focus state is obtained by AF is limited to the AF-enabled area. This configuration can prevent the user from unintentionally moving the focus lens to the MF-dedicated area, and improve the operability of the user.

Third Embodiment

A description will now be given of a third embodiment according to the disclosure. In this embodiment, regardless of whether the driving method is AF, MF, or full-time MF, in the case where the AF mode is set by the focus mode switch 113, the AF-enabled area illustrated in FIG. 2 is selected as the driving area of the focus lens 105. On the other hand, in the case where the MF mode is set by the focus mode switch 113, the area (overall driving area) including the AF-enabled area and the MF-dedicated area illustrated in FIG. 2 is selected as the driving area of the focus lens 105.

Figure 7:
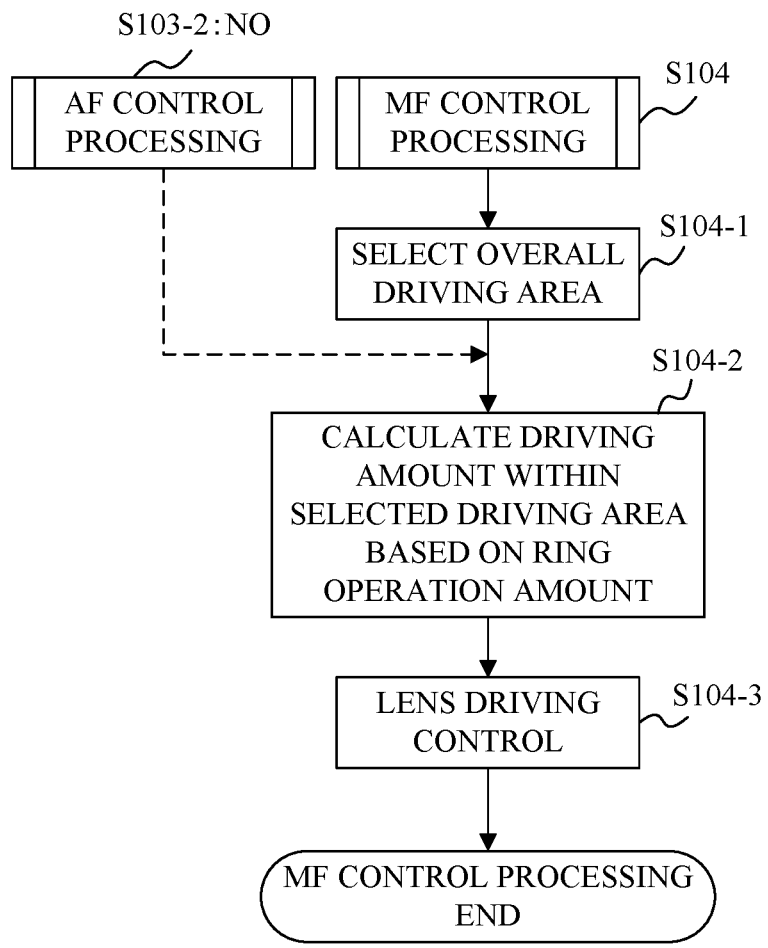
FIG. 7 is a flowchart illustrating MF control in the lens apparatus according to the third embodiment.

Referring now to FIG. 7, a description will be given of the setting of a driving area by a driving mode set by the focus mode switch 113 in this embodiment. FIG. 7 is a flowchart illustrating the MF control (MF control processing) in the interchangeable lens 100, and illustrates MF control processing during full-time MF driving and at a normal time, respectively. In this embodiment, the lens-side driving processing and the lens-side AF control processing are similar to those in the first embodiment, and thus a description thereof will be omitted.

In the case where it is determined that the ring operation amount is not zero during the AF control processing (step S103-2: No) and the flow proceeds to the MF control processing, the flow proceeds to step S104-2. At this time, the lens microcomputer 112 performs the MF driving processing (steps S104-2 and S104-3) in the AF-enabled area (first driving area) selected in step S103-1, and ends the MF control processing. On the other hand, in the case where the mode shifts to the MF control processing because the driving mode is not the AF mode in step S102, the flow proceeds to step S104-1. In step S104-1, similarly to the first embodiment, the lens microcomputer 112 selects the overall driving area including the AF-enabled area (first driving area) and the MF-dedicated area (second driving area). Then, the lens microcomputer 112 performs the MF driving processing (steps S104-2 and S104-3) and ends the MF control processing.

Thus, in this embodiment, in the case where the first driving mode (AF mode) is set by the focus mode switch 113, the second control unit 112b is disenabled in the MF-dedicated area. That is, in this embodiment, in the case where the focus mode switch 113 is set to the AF mode, the driving area of the focus lens 105 is limited to the AF-enabled area. This configuration can prevent the user from unintentionally moving the focus lens to the MF-dedicated area, and improve the operability of the user.

Fourth Embodiment

A description will now be given of a fourth embodiment according to the disclosure. In this embodiment, the operation unit 205 of the camera body 200 has a function similar to that of the focus mode switch 113. In the case where the AF mode is set by the operation unit 205, the AF-enabled area illustrated in FIG. 2 is selected as the driving area of the focus lens 105. On the other hand, in the case where the MF mode is set by the operation unit 205, the area (overall driving area) including the AF-enabled area and the MF-dedicated area illustrated in FIG. 2 is selected as the driving area of the focus lens 105. Information on the selected driving area is transmitted from the camera body 200 to the interchangeable lens 100. The focus-lens control unit 109 drives and controls the focus lens 105 based on the received information on the driving area.

Figure 8:
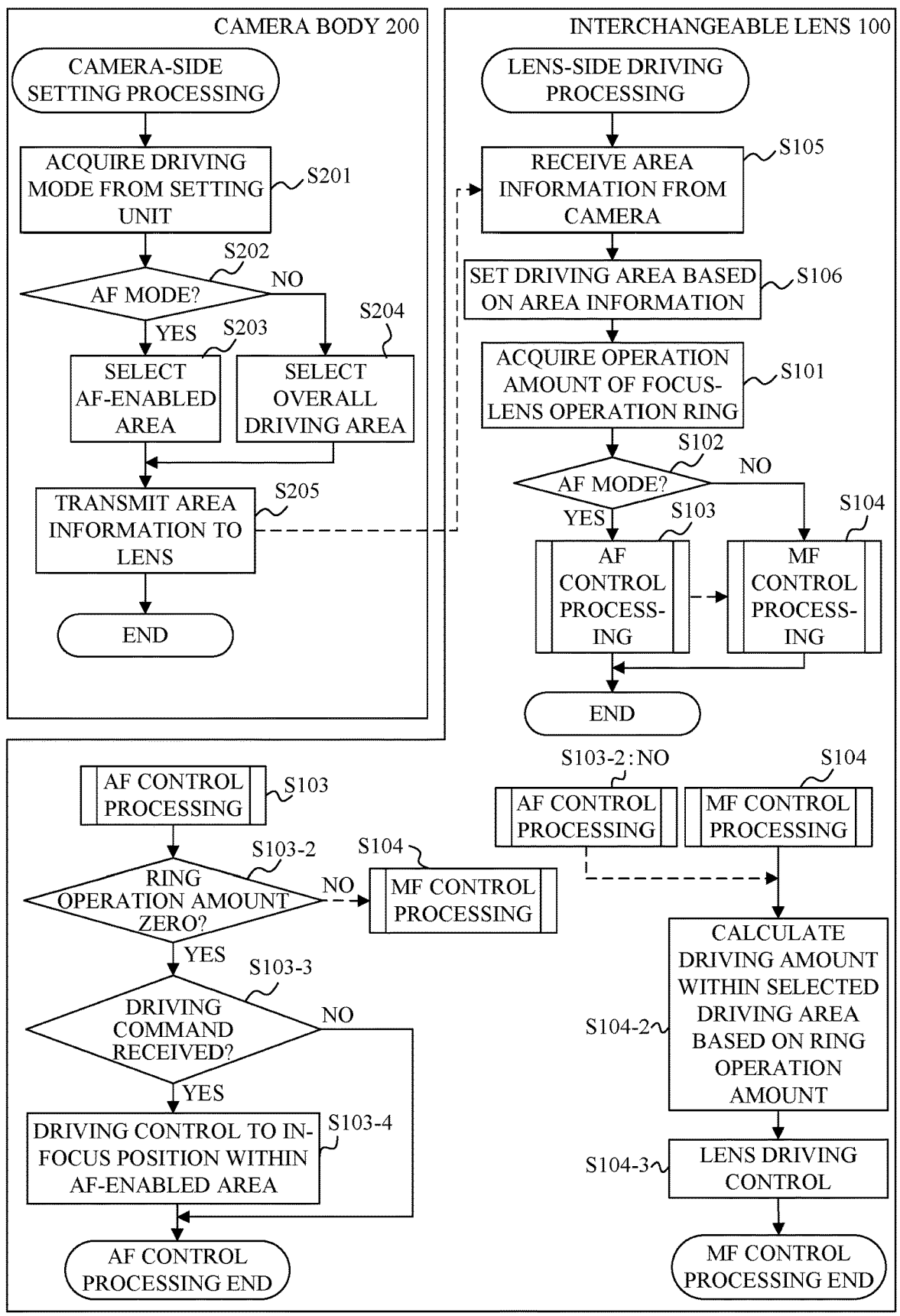
FIG. 8 is a flowchart illustrating a control method of a camera body and a lens apparatus according to a fourth embodiment.

Referring to FIG. 8, a description will be given of the setting of a driving area by a driving mode set by the operation unit (focus mode switch) 205 in this embodiment. FIG. 8 is a flowchart illustrating a control method of the camera body 200 and the interchangeable lens 100, and illustrates camera-side setting processing and lens-side driving processing.

A description will now be given of the camera-side setting processing. In step S201, the camera microcomputer 206 acquires the driving mode from the operation unit 205 of the camera body 200. Next, in step S202, the camera microcomputer 206 determines whether or not the driving mode set by the operation unit 205 is the AF mode. When the driving mode is the AF mode, the flow proceeds to step S203, and the camera microcomputer 206 selects the AF-enabled area. On the other hand, when the driving mode is the MF mode, the flow proceeds to step S204, and the camera microcomputer 206 selects the overall driving area including the AF-enabled area and the MF-dedicated area. Next, in step S205, the camera microcomputer (communication unit) 206 transmits information on the driving mode and the driving area to the lens microcomputer 112 via the communication terminal unit, and ends this setting processing.

A description will now be given of the lens-side driving processing. First, the lens microcomputer 112 receives the area information from the camera microcomputer 206 in step S105. The lens microcomputer 112 sets the driving area based on the received area information (step S106), and the flow proceeds to the next step. Next, the ring operation amount of the operation ring 110 is acquired in step S101, and the flow proceeds to step S102. In step S102, depending on the driving mode and the driving area received from the camera microcomputer 206, the flow proceeds to the AF control processing (step S103) in the case of the AF mode and MF control processing (step S104) in the case of the MF mode.

A description will now be given of the flow of lens-side AF control processing. In step S103-2, the lens microcomputer 112 determines the ring operation amount acquired in step S101. In the case where the ring operation amount is zero, the AF control processing is continued (moving to step S103-3). On the other hand, in the case where the ring operation amount is not zero, the flow is moved to the MF control processing by the full-time MF function (step S104). In the case where the driving command from the camera microcomputer 206 is received in step S103-3, the flow proceeds to step S103-4. In step S103-4, according to the command of the lens microcomputer 112, the focus-lens control unit 109 controls the focus lens 105 to the in-focus position within the AF-enabled area selected in step S106. On the other hand, in the case where the driving command has not been received, the AF control processing is terminated.

A description will now be given of the MF control processing. In the case where the MF mode is set in step S102 and it is determined that the ring operation amount is not zero during the AF control processing (step S103-2: No) and the flow shifts to the MF control processing, the flow proceeds to step S104-2. In step S104-2, the lens microcomputer 112 calculates a driving amount of the focus lens 105 in the driving area selected in step S106 based on the ring operation amount acquired in step S101. Next, in step S104-3, the focus-lens control unit 109 drives and controls the focus lens 105 based on the driving amount calculated in step S104-2 according to the command of the lens microcomputer 112, and ends the MF control processing.

Thus, in this embodiment, in the case where the setting of the operation unit 205 in the camera body 200 is the AF mode, the driving area of the focus lens 105 is limited to the AF-enabled area. This configuration can prevent the user from unintentionally moving the focus lens to the MF-dedicated area, and improve the operability of the user.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment provides a control apparatus, a lens apparatus, an image pickup apparatus, a control method, and a storage medium, each of which can prevent switching from an AF-enabled area to the MF-dedicated area against the intention of a user and improve the user's operability.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

For example, after the first control unit 112a adjusts the focus lens 105 to the in-focus position (for example, after the AF operation is completed while the release button is being half-pressed), the second control unit 112b may be enabled in the MF-dedicated area. While the first control unit 112a does not drive the focus lens 105 (except during the AF operation), the second control unit 112b may be enabled in the MF-dedicated area.

This application claims the benefit of Japanese Patent Application No. 2021-105323, filed on Jun. 25, 2021, which is hereby incorporated by reference herein in its entirety.

What is claimed is:

1. A control apparatus comprising:
at least one processor; and
at least one memory coupled to the at least one processor storing instructions that, when executed by the at least one processor, cause the at least one processor to function as:
an autofocus control unit configured to automatically adjust a focus lens to an in-focus position; and
a manual focus control unit configured to manually adjust the focus lens based on an operation amount of a user,
wherein the autofocus control unit and the manual focus control unit are enabled in an autofocus driving area of the focus lens,
wherein the autofocus control unit is disenabled in a manual focus driving area of the focus lens, and
wherein while the autofocus control unit adjusts the focus lens to the in-focus position in the autofocus driving area of the focus lens, the manual focus control unit is enabled in the autofocus driving area, and the manual focus control unit is disenabled in the manual focus driving area.

2. The control apparatus according to claim 1, wherein after the autofocus control unit adjusts the focus lens to the in-focus position, the manual focus control unit is disenabled in the manual focus driving area.

3. The control apparatus according to claim 1,
wherein in a case where an autofocus driving mode is set, the manual focus control unit is disenabled in the manual focus driving area, and
wherein in a case where a manual focus driving mode is set, the manual focus control unit is enabled in the manual focus driving area.

4. The control apparatus according to claim 1, wherein after the autofocus control unit adjusts the focus lens to the in-focus position, the manual focus control unit is enabled in the manual focus driving area.

5. The control apparatus according to claim 1, wherein while the autofocus control unit is not driving the focus lens, the manual focus control unit is enabled in the manual focus driving area.

6. A lens apparatus comprising:
a focus lens; and
a control apparatus according to claim 1.

7. The lens apparatus according to claim 6,
wherein the at least one processor further functions as a setting unit configured to set an autofocus driving mode and a manual focus driving mode,
wherein in a case where the autofocus driving mode is set, the manual focus control unit is disenabled in the manual focus driving area, and
wherein in a case where the manual focus driving mode is set, the manual focus control unit is enabled in the manual focus driving area.

8. An image pickup apparatus comprising:
an image sensor; and
a control apparatus according to claim 1.

9. The image pickup apparatus according to claim 8,
wherein the at least one processor further functions as a setting unit configured to set an autofocus driving mode and a manual focus driving mode,
wherein in a case where the autofocus driving mode is set, the manual focus control unit is disenabled in the manual focus driving area, and
wherein in a case where the manual focus driving mode is set, the manual focus control unit is enabled in the manual focus driving area.

10. The image pickup apparatus according to claim 9, further comprising a communication unit configured to communicate with the lens apparatus,
wherein the communication unit
transmits information on the autofocus driving area to the lens apparatus in the case where the autofocus driving mode is set, and
transmits information on an area including the autofocus driving area and the manual focus driving area to the lens apparatus in the case where the manual focus driving mode is set.

11. A control method comprising:
an autofocus configured to automatically adjust a focus lens to an in-focus position; and
a manual focus control configured to manually adjust the focus lens based on an operation amount of a user,
wherein the autofocus control and the manual focus control are enabled in an autofocus driving area of the focus lens,
wherein the autofocus control is disenabled in a manual focus driving area of the focus lens, and
wherein while the autofocus control adjusts the focus lens to the in-focus position in the autofocus driving area of the focus lens, the manual focus control is enabled in the autofocus driving area, and the manual focus control is disenabled in the manual focus driving area.

12. A non-transitory computer-readable storage medium storing a program that causes a computer to execute the control method according to claim 11.

* * * * *